US010578442B2

(12) United States Patent
Denaro

(10) Patent No.: US 10,578,442 B2
(45) Date of Patent: *Mar. 3, 2020

(54) DATA MINING TO IDENTIFY LOCATIONS OF POTENTIALLY HAZARDOUS CONDITIONS FOR VEHICLE OPERATION AND USE THEREOF

(71) Applicant: HERE Global B.V., Eindhoven (NL)

(72) Inventor: Robert Denaro, Long Grove, IL (US)

(73) Assignee: HERE Global B.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/388,443

(22) Filed: Apr. 18, 2019

(65) Prior Publication Data
US 2019/0249995 A1 Aug. 15, 2019

Related U.S. Application Data

(63) Continuation of application No. 15/644,374, filed on Jul. 7, 2017, now Pat. No. 10,323,945, which is a
(Continued)

(51) Int. Cl.
G01C 21/26 (2006.01)
G06F 16/44 (2019.01)
(Continued)

(52) U.S. Cl.
CPC ............. G01C 21/26 (2013.01); G01C 21/32 (2013.01); G01C 21/3697 (2013.01); G06F 16/444 (2019.01)

(58) Field of Classification Search
CPC .... G01C 21/26; G01C 21/32; G01C 21/3697; G06F 16/444
See application file for complete search history.

(56) References Cited

U.S. PATENT DOCUMENTS 4,775,865 A 10/1988 Smith et al.
5,270,708 A 12/1993 Kamishima
(Continued)

FOREIGN PATENT DOCUMENTS

DE 10030819 1/2002
EP 1069547 A1 1/2001
EP 1104881 A1 6/2001

OTHER PUBLICATIONS

European Office Action dated Mar. 8, 2018, European Office Action cited in the corresponding European Application No. 09 251 231.8; Mar. 8, 2018; 6 pages.
(Continued)

Primary Examiner — Christian Chace
Assistant Examiner — Jordan S Fei
(74) Attorney, Agent, or Firm — Lempia Summerfield Katz LLC

(57) ABSTRACT

Disclosed is a feature for a vehicle that enables taking precautionary actions in response to conditions on the road network around or ahead of the vehicle. A database that represents the road network is used to determine locations where a potentially hazardous condition exists. Then, precautionary action data is added to the database to indicate a location at which a precautionary action is to be taken relating to the hazardous condition. A precautionary action system installed in a vehicle uses this database, or a database derived therefrom, in combination with a positioning system to determine when the vehicle is at a location that corresponds to the location of a precautionary action. When the vehicle is at such a location, a precautionary action is taken by a vehicle system as the vehicle is approaching the location where the potentially hazardous condition exists.

33 Claims, 4 Drawing Sheets

Related U.S. Application Data continuation of application No. 14/847,121, filed on Sep. 8, 2015, now Pat. No. 9,733,093, which is a continuation of application No. 12/156,264, filed on May 30, 2008, now Pat. No. 9,134,133.

(51) Int. Cl.
*G01C 21/36* (2006.01)
*G01C 21/32* (2006.01)

(56) References Cited

U.S. PATENT DOCUMENTS

| | | |
|---|---|---|
| 5,280,632 A | 1/1994 | Jung-Gon |
| 5,315,295 A | 5/1994 | Fujii |
| 5,617,086 A | 4/1997 | Klashinsky et al. |
| 5,635,920 A | 6/1997 | Pogue et al. |
| 5,642,093 A | 6/1997 | Kinoshita et al. |
| 5,757,949 A | 5/1998 | Kinoshita et al. |
| 5,856,902 A | 1/1999 | Hashimoto et al. |
| 5,864,784 A | 1/1999 | Brayton et al. |
| 5,904,728 A | 5/1999 | Tamai et al. |
| 5,944,768 A | 8/1999 | Ito et al. |
| 5,978,724 A | 11/1999 | Sekine |
| 5,978,731 A | 11/1999 | Matsuda |
| 6,008,741 A | 12/1999 | Shinagawa et al. |
| 6,064,941 A | 5/2000 | Nimura et al. |
| 6,067,497 A | 5/2000 | Sekine et al. |
| 6,084,510 A | 7/2000 | Lemelson et al. |
| 6,088,659 A | 7/2000 | Kelley et al. |
| 6,092,005 A | 7/2000 | Okada |
| 6,092,014 A | 7/2000 | Okada |
| 6,141,619 A | 10/2000 | Sekine |
| 6,157,891 A | 12/2000 | Lin |
| 6,161,071 A | 12/2000 | Shuman et al. |
| 6,188,316 B1 | 2/2001 | Matsuno et al. |
| 6,199,011 B1 | 3/2001 | Matsuda |
| 6,204,778 B1 | 3/2001 | Bergan et al. |
| 6,208,927 B1 | 3/2001 | Mine et al. |
| 6,223,125 B1 | 4/2001 | Hall |
| 6,226,389 B1 | 5/2001 | Lemelson |
| 6,298,296 B1 | 10/2001 | Takahashi |
| 6,343,253 B1 | 1/2002 | Matsuura et al. |
| 6,353,785 B1 | 3/2002 | Shuman et al. |
| 6,356,839 B1 | 3/2002 | Monde et al. |
| 6,381,536 B1 | 4/2002 | Satoh et al. |
| 6,389,332 B1 | 5/2002 | Hess et al. |
| 6,401,023 B1 | 6/2002 | Takahashi |
| 6,405,128 B1 | 6/2002 | Bechtolsheim et al. |
| 6,411,896 B1 | 6/2002 | Shuman et al. |
| 6,415,222 B1 | 7/2002 | Sato et al. |
| 6,415,226 B1 | 7/2002 | Kozak |
| 6,424,904 B1 | 7/2002 | Takahashi et al. |
| 6,466,867 B1 | 10/2002 | Sakashita |
| 6,470,265 B1 | 10/2002 | Tanaka |
| 6,480,783 B1 | 11/2002 | Myr |
| 6,674,434 B1 | 1/2004 | Chojnacki et al. |
| 6,675,085 B2 | 1/2004 | Straub |
| 6,696,976 B1 | 2/2004 | Hansen |
| 6,718,262 B2 | 4/2004 | Matsuda et al. |
| 6,820,005 B2 | 11/2004 | Matsuda et al. |
| 6,850,841 B1 | 2/2005 | Casino |
| 6,864,784 B1 | 3/2005 | Loeb |
| 6,873,892 B2 | 3/2005 | Katz et al. |
| 6,931,319 B2 | 8/2005 | Adachi |
| 6,952,647 B2 | 10/2005 | Hasegawa et al. |
| 6,954,696 B2 | 10/2005 | Ihara et al. |
| 7,007,011 B1 | 2/2006 | Joshi |
| 7,043,357 B1 | 5/2006 | Stankoulov et al. |
| 7,171,306 B2 | 1/2007 | Hirose |
| 7,184,073 B2 | 2/2007 | Varadarajan et al. |
| 7,194,347 B2 | 3/2007 | Harumoto et al. |
| 7,259,746 B2 | 8/2007 | Kato et al. |
| 7,266,438 B2 | 9/2007 | Kellum et al. |
| 7,340,341 B2 | 3/2008 | Adachi |
| 7,400,963 B2 | 7/2008 | Lee et al. |
| 7,479,897 B2 | 1/2009 | Gertsch et al. |
| 7,516,041 B2 | 4/2009 | Smartt et al. |
| 7,680,749 B1 | 3/2010 | Golding et al. |
| 7,751,973 B2 | 7/2010 | Ibrahim |
| 8,204,680 B1 | 6/2012 | Dorum |
| 8,571,811 B1 | 10/2013 | Mueller |
| 8,775,073 B2 | 7/2014 | Denaro |
| 9,121,716 B2 | 9/2015 | Denaro |
| 9,182,241 B2 | 11/2015 | Denaro |
| 9,752,884 B2 | 9/2017 | Denaro |
| 2001/0001133 A1 | 5/2001 | Hotta |
| 2001/0020902 A1 | 9/2001 | Tamura |
| 2002/0069019 A1 | 6/2002 | Lin |
| 2002/0077733 A1 | 6/2002 | Bidaud |
| 2002/0128752 A1 | 9/2002 | Joshi |
| 2002/0161513 A1 | 10/2002 | Bechtolsheim et al. |
| 2002/0188400 A1 | 12/2002 | Sato et al. |
| 2002/0194016 A1 | 12/2002 | Moribe et al. |
| 2003/0005765 A1 | 1/2003 | Brudis et al. |
| 2003/0016145 A1 | 1/2003 | Bateman |
| 2003/0016146 A1 | 1/2003 | Bates et al. |
| 2003/0043059 A1 | 3/2003 | Miller, Jr. |
| 2003/0090392 A1 | 5/2003 | Schuessler |
| 2003/0130780 A1 | 7/2003 | Shiimado et al. |
| 2003/0182051 A1 | 9/2003 | Yamamoto |
| 2004/0022416 A1 | 2/2004 | Lemelson et al. |
| 2004/0030670 A1 | 2/2004 | Barton |
| 2004/0039523 A1 | 2/2004 | Kainuma et al. |
| 2004/0107042 A1 | 6/2004 | Seick |
| 2004/0107047 A1 | 6/2004 | Joshi |
| 2004/0143385 A1 | 7/2004 | Smyth et al. |
| 2004/0143390 A1 | 7/2004 | King et al. |
| 2004/0201672 A1 | 10/2004 | Varadarajan et al. |
| 2004/0267455 A1 | 12/2004 | Hatano et al. |
| 2005/0065682 A1 | 3/2005 | Kapadia et al. |
| 2005/0149251 A1 | 7/2005 | Donath et al. |
| 2005/0240334 A1 | 10/2005 | Matsumoto et al. |
| 2005/0251335 A1 | 11/2005 | Ibrahim |
| 2005/0264404 A1 | 12/2005 | Franczyk et al. |
| 2006/0041372 A1 | 2/2006 | Kubota et al. |
| 2006/0064239 A1 | 3/2006 | Ishii |
| 2006/0097859 A1 | 5/2006 | Nordbruch |
| 2006/0109095 A1 | 5/2006 | Takata et al. |
| 2006/0114125 A1 | 6/2006 | Kubota et al. |
| 2006/0149780 A1 | 7/2006 | Joshi |
| 2006/0220904 A1 | 10/2006 | Jarlengrip |
| 2006/0287817 A1 | 12/2006 | Nagel |
| 2007/0008090 A1 | 1/2007 | Gertsch et al. |
| 2007/0021910 A1 | 1/2007 | Iwami et al. |
| 2007/0027583 A1 | 2/2007 | Tamir et al. |
| 2007/0040705 A1 | 2/2007 | Yoshioka et al. |
| 2007/0050127 A1 | 3/2007 | Kellum et al. |
| 2007/0050130 A1 | 3/2007 | Grimm et al. |
| 2007/0162019 A1 | 7/2007 | Bums et al. |
| 2007/0192020 A1 | 8/2007 | Brulle-Drews et al. |
| 2007/0222662 A1 | 9/2007 | Toennesen et al. |
| 2007/0288158 A1 | 12/2007 | Dorum |
| 2007/0296574 A1 | 12/2007 | Smith et al. |
| 2008/0004806 A1 | 1/2008 | Kimura et al. |
| 2008/0033621 A1 | 2/2008 | Nakamura et al. |
| 2008/0042815 A1 | 2/2008 | Breed et al. |
| 2008/0046274 A1 | 2/2008 | Geelen et al. |
| 2008/0077309 A1 | 3/2008 | Cobbold |
| 2008/0169914 A1 | 7/2008 | Albertson et al. |
| 2008/0215238 A1 | 9/2008 | Geelen et al. |
| 2008/0243380 A1 | 10/2008 | Han |
| 2009/0140887 A1 | 6/2009 | Breed et al. |
| 2009/0144030 A1 | 6/2009 | Witmer |
| 2009/0295598 A1 | 12/2009 | Denaro |
| 2009/0295604 A1 | 12/2009 | Denaro |
| 2009/0296630 A1 | 12/2009 | Chen et al. |
| 2009/0299615 A1 | 12/2009 | Denaro |
| 2009/0299616 A1 | 12/2009 | Denaro |
| 2009/0299617 A1 | 12/2009 | Denaro |
| 2009/0299622 A1 | 12/2009 | Denaro |
| 2009/0299624 A1 | 12/2009 | Denaro |
| 2009/0299625 A1 | 12/2009 | Denaro |
| 2009/0299626 A1 | 12/2009 | Denaro |
| 2009/0299630 A1 | 12/2009 | Denaro |

(56) References Cited

U.S. PATENT DOCUMENTS

| | | |
|---|---|---|
| 2009/0300035 A1 | 12/2009 | Denaro |
| 2009/0300053 A1 | 12/2009 | Denaro |
| 2009/0300067 A1 | 12/2009 | Denaro |
| 2010/0001133 A1 | 1/2010 | Kempa et al. |
| 2010/0121886 A1 | 5/2010 | Koshiba et al. |
| 2010/0191421 A1 | 7/2010 | Nilsson |
| 2010/0332266 A1 | 12/2010 | Tamir et al. |
| 2016/0018227 A1 | 1/2016 | Denaro |

OTHER PUBLICATIONS

European Search Report for related European Application No. 09251231.8 dated Apr. 5, 2016.

DATA MINING TO IDENTIFY LOCATIONS OF POTENTIALLY HAZARDOUS CONDITIONS FOR VEHICLE OPERATION AND USE THEREOF

REFERENCE TO RELATED APPLICATIONS

This application is a continuation under 37 C.F.R. § 1.53(b) of U.S. patent application Ser. No. 15/644,374 filed Jul. 7, 2017 now U.S. patent Ser. No. 10/323,945, which is a continuation under 37 C.F.R. § 1.53(b) of U.S. patent application Ser. No. 14/847,121 filed Sep. 8, 2015 now U.S. Pat. No. 9,733,093, which is a continuation of U.S. patent application Ser. No. 12/156,264 filed May 30, 2008 now U.S. Pat. No. 9,134,133, the entire disclosures of which are hereby incorporated by reference. The present patent application is related to the copending patent applications filed on the same date:

Ser. No. 12/156,326 entitled "DATA MINING IN A DIGITAL MAP DATABASE TO IDENTIFY INSUFFICIENT SUPPERELEVATION ALONG ROADS AND ENABLING PRECAUTIONARY ACTIONS IN A VEHICLE,", now U.S. Pat. No. 9,121,716

Ser. No. 12/156,277 entitled "DATA MINING IN A DIGITAL MAP DATABASE TO IDENTIFY INTERSECTIONS LOCATED AT HILL BOTTOMS AND ENABLING PRECAUTIONARY ACTIONS IN A VEHICLE,", now U.S. Pat. No. 8,466,810;

Ser. No. 12/156,224 entitled "DATA MINING IN A DIGITAL MAP DATABASE TO IDENTIFY DECREASING RADIUS OF CURVATURE ALONG ROADS AND ENABLING PRECAUTIONARY ACTIONS IN A VEHICLE,", now U.S. Pat. No. 8,698,649;

Ser. No. 12/156,311 entitled "DATA MINING IN A DIGITAL MAP DATABASE TO IDENTIFY CURVES ALONG DOWNHILL ROADS AND ENABLING PRECAUTIONARY ACTIONS IN A VEHICLE,", now U.S. Pat. No. 8,332,143;

Ser. No. 12/156,310 entitled "DATA MINING IN A DIGITAL MAP DATABASE TO IDENTIFY TRAFFIC SIGNALS AND STOP SIGNS AT BOTTOMS OF HILLS AND ENABLING PRECAUTIONARY ACTIONS IN A VEHICLE,", now U.S. Pat. No. 8,026,835;

Ser. No. 12/156,243 entitled "DATA MINING IN A DIGITAL MAP DATABASE TO IDENTIFY TRAFFIC SIGNALS OR SIGNS ALONG ROAD CURVES AND ENABLING PRECAUTIONARY ACTIONS IN A VEHICLE,", now U.S. Pat. No. 8,009,061

Ser. No. 12/156,276 entitled "DATA MINING IN A DIGITAL MAP DATABASE TO IDENTIFY BLIND INTERSECTIONS ALONG ROADS AND ENABLING PRECAUTIONARY ACTIONS IN A VEHICLE,", now U.S. Pat. No. 8,688,369;

Ser. No. 12/156,269 entitled "DATA MINING IN A DIGITAL MAP DATABASE TO IDENTIFY SPEED CHANGES ON UPCOMING CURVES ALONG ROADS AND ENABLING PRECAUTIONARY ACTIONS IN A VEHICLE,";

Ser. No. 12/156,299 entitled "DATA MINING IN A DIGITAL MAP DATABASE TO IDENTIFY UNUSUALLY NARROW LANES OR ROADS AND ENABLING PRECAUTIONARY ACTIONS IN A VEHICLE,", now U.S. Pat. No. 9,182,241;

Ser. No. 12/156,304 entitled "DATA MINING IN A DIGITAL MAP DATABASE TO IDENTIFY INTERSECTIONS LOCATED OVER HILLS AND ENABLING PRECAUTIONARY ACTIONS IN A VEHICLE,";

Ser. No. 12/156,303 entitled "DATA MINING IN A DIGITAL MAP DATABASE TO IDENTIFY INSUFFICIENT MERGE LANES ALONG ROADS AND ENABLING PRECAUTIONARY ACTIONS IN A VEHICLE,", now U.S. Pat. No. 8,775,073; and Ser. No. 12/156,270 entitled "DATA MINING IN A DIGITAL MAP DATABASE TO IDENTIFY COMMUNITY REPORTED DRIVING HAZARDS ALONG ROADS AND ENABLING PRECAUTIONARY ACTIONS IN A VEHICLE,", now U.S. Pat. No. 8,134,478; the entire disclosures of which are incorporated by reference herein.

BACKGROUND

The present invention relates to a method and system that enables taking a precautionary action in a vehicle, such as providing a warning to a vehicle driver about a potentially difficult, challenging or hazardous driving condition on the road network.

Advanced driver assistance systems ("ADAS"), including active safety and fuel economy systems, have been developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, and adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and lidar. Some advanced driver assistance systems also use digital map data. Digital map data can be used in advanced driver assistance systems to provide information about the road network, road geometry, road conditions and other items associated with the road and terrain around the vehicle. Digital map data is not affected by environmental conditions, such as fog, rain or snow. In addition, digital map data can provide useful information that cannot reliably be provided by cameras or radar, such as curvature, grade, bank, speed limits that are not indicated by signage, traffic and lane restrictions, etc. Further, digital map data can provide a predictive capability well beyond the range of other sensors or even beyond the driver's vision to determine the road ahead of the vehicle, around corners, over hills or beyond obstructions. Accordingly, digital map data can be a useful addition for some advanced driver assistance systems.

Although these kinds of systems provide useful features, there exists room for further improvements. For example, it would be useful to identify locations on the road network where a relatively high number of traffic accidents have occurred. However, statistics pertaining to accidents are maintained by various different administrative entities that use different formats, standards, reporting methods, reporting periods, etc. Accordingly, it is difficult to obtain consistent information about traffic accidents on roads in a large geographic region, such as the entire United States or Europe. Moreover, data indicating locations where a statistically large number of traffic accidents occur may not indicate the causes of the accidents or how accidents can be avoided.

Accordingly, it is an objective to provide a system that facilitates taking a precautionary action in a vehicle, such as providing a warning to a vehicle operator, when approaching a location where accidents may occur.

SUMMARY

To address these and other objectives, the present invention comprises data mining in a digital roadmap database with its associated road feature data attributes to identify potentially hazardous locations on a road where critical attributes exceed a threshold representing that hazardous condition, or to identify combinations of digital roadmap database features that, in combination, constitute a potentially hazardous condition, and subsequently store such features in the database to enable the driver to be more cautious or to take a precautionary action, or for the vehicle to automatically take a precautionary action or adjust control or sensor sensitivities to accommodate the hazardous condition as the vehicle approaches the location identified as being hazardous or difficult. The precautionary action may be a warning message provided to the vehicle driver to alert the vehicle driver about the condition so that the vehicle driver can pay extra attention. Alternatively, the precautionary action may consist of an actual modification of the operation or control of the vehicle, such as braking, accelerating, or maneuvering the vehicle, or activating a sensor. Alternatively, the precautionary action may include providing an input to an algorithm that also processes inputs from other sensors for taking such actions. Alternatively, the precautionary action may be adjustment of sensitivities of other ADAS applications such as increasing the control authority and sensitivity of a lane departure warning or control system to lane edge approach and violation. In another alternative, the precautionary action may include a combination of any of these aforementioned actions.

According to further aspects, a precautionary action system installed in a vehicle uses this database, or a database derived therefrom, in combination with a positioning system, to determine when the vehicle is at a location that corresponds to the location identified as being difficult, hazardous or challenging. When the vehicle is at or approaching such a location, the precautionary action is taken, such as providing a warning to the vehicle operator to alert the vehicle operator about the condition.

DETAILED DESCRIPTION OF THE DRAWINGS AND PRESENTLY PREFERRED EMBODIMENTS

Figure 1:
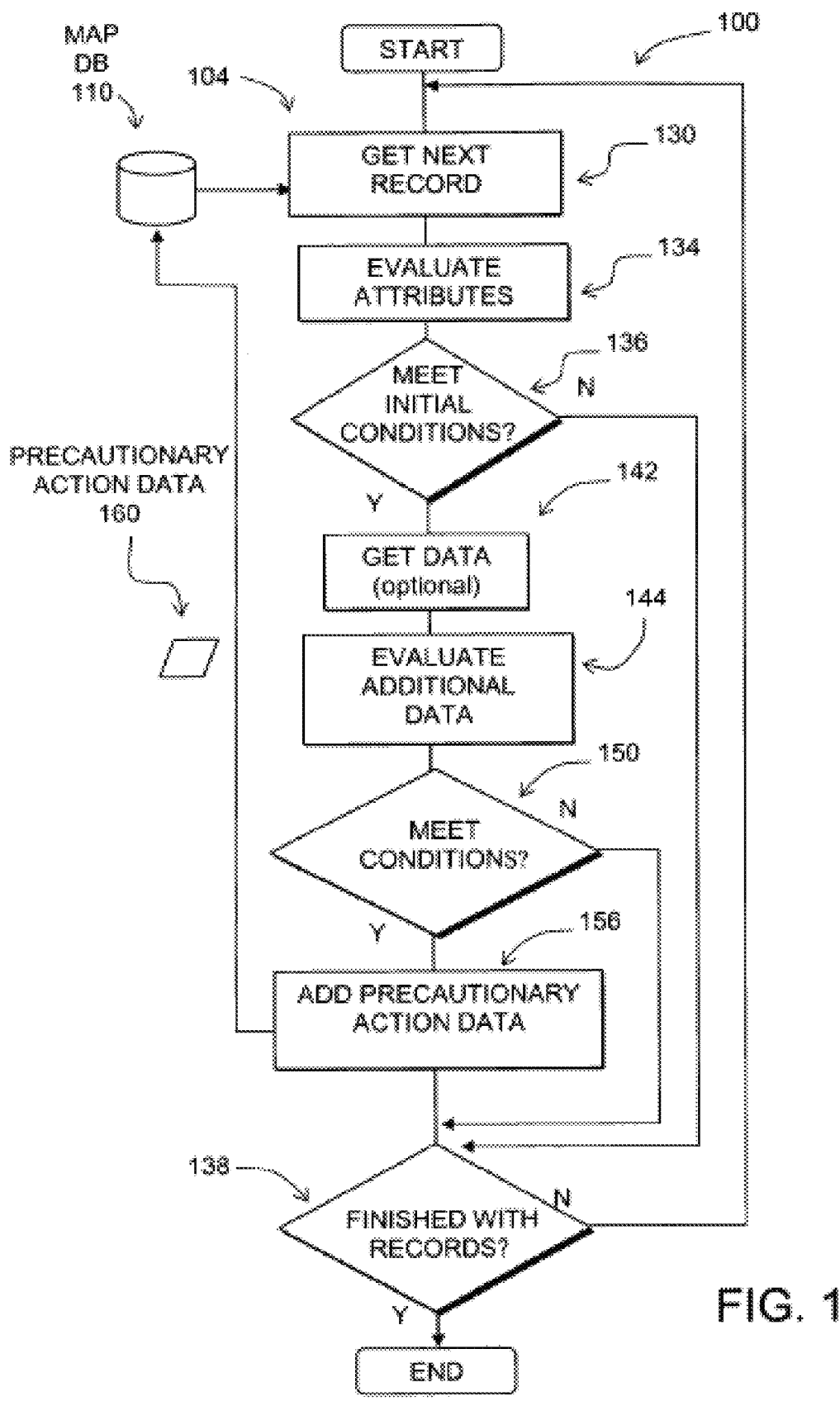
FIG. 1 is a flowchart of a process that uses a database that represents a road network to identify conditions such as the one shown in FIG. 1.

FIG. 1 is a flowchart of a process 100. The process 100 is performed by a software program or routine that is run on a suitable computing platform, such as a database server, PC or plurality of PCs coupled together for parallel computing applications.

The process 100 uses a database 110 that contains data that represents the road network in a region. The region may be a country, such as the United States, Germany, France or Korea. Alternatively, the region may include several countries or an entire continent. According to another alternative, the region may include only a portion of a country, such as a state or several states or metropolitan areas.

The process 100 is performed by a map developer, such as NAVTEQ Corporation. Alternatively, the process 100 may be performed by another entity that has access to an editable version of a map database 110. For example, the process may be performed by a customer or licensee of NAVTEQ, such as a manufacturer of navigation systems or active safety systems, or by a traffic information services company or by a government office at any level.

The database 110 is in a format that can be edited. That is, new or updated information can be added to the database 110. Alternatively, the database 110 is in a format such that new information can be combined with the original data to form a new database that includes both the original data and new data. In one embodiment, the database is in an Oracle spatial format. Alternatively, the database may be in a delivery format, such as GDF (Geographic Data File), SIF (Standard Interchange Format), or other formats, including proprietary formats.

As stated above, the database 110 contains data that represents the road network in the region. The database 110 contains information such as the locations (geographic coordinates, including altitude) of roads and intersections, road names, the three-dimensional shape of the roads including curvature, slope and bank, speed limits along roads, turn restrictions at intersections, addresses or address ranges along roads, the number of lanes each road has, lane width, lane markings, functional classes of roads, the locations of medians, and so on. The database may also contain information about other geographic features, such as bodies of water, parks, administrative areas (including municipal, state and country boundaries), and locations of points of interest, such as businesses, hospitals, police stations, and so on.

In FIG. 1, the process 100 examines each data record that represents a geographic feature, such as a link (or road segment) or intersection, to determine whether it represents a location or leads to a location where a potentially difficult or hazardous condition exists. The kinds of potentially difficult or hazardous conditions may include, but are not limited to, a turn with a decreasing radius of curvature, a turn where the superelevation (bank angle) is insufficient or in the wrong direction, i.e., banked away from the curve instead of into it, a downhill segment that has an intersection at the bottom of the hill, a downhill segment that has a stop sign or stoplight at the bottom of the hill, a sharp curve on a downhill slope, a curve that has a stop sign or stoplight somewhere along the curve, a blind intersection either because it is in a turn or over a hill, an unusually narrow lane or road, a lane merge, a road entrance with no stop sign or stoplight that has no merge lane, and a curve with a lower speed recommendation than the preceding straight segment speed limit.

The process 100 may employ a staged or multiple step process wherein combinations and/or thresholds of data are evaluated to determine whether a hazardous condition exists. With such a process, a comprehensive evaluation of an entire region can be performed by evaluating first each instance of data that represents a type of feature for an initial set of conditions, and then evaluating that instance of data in combination with other data only if the initial conditions are met. As an example, the process 100 may examine in turn each data record in the entire database that represents each road segment (also referred to as a "link"), and in each direction of travel. In one step, a data record that represents a link or road segment is read from the database 110 (Step 130). Adjacent road segments records may also be read. This road segment record includes data attributes that indicate various features of the represented road segment. The attributes are evaluated to determine whether the represented road segment might have or lead to a difficult or hazardous driving condition (Step 134). The attributes that are evaluated depend on the type of difficult or hazardous condition the process 100 is attempting to find. For example, to locate curves that exceed a certain threshold of severity, each curve is inspected for its curvature values, length of the curve, and other attributes of the curve. In another example, in order to locate intersections at the bottom of a hill, the altitude of the endpoints of the road segment or adjacent road segments are compared to determine whether the road segment is on a hill. On the other hand, to determine whether a blind intersection is in turn, the shape points or curvature of the road segment are evaluated to determine whether the road segment is part of a curve or at the end of a curve. From an evaluation of this information, it can be determined whether the represented road segment and its adjacent road segments might be part of, or lead to, a location of a potentially hazardous condition. If the represented feature is determined not to meet the initial conditions, the process 100 proceeds to a step in which it is determined whether all the records that represent that feature in the database have been examined (Steps 136 and 138). If there are more records to examine, the process 100 proceeds to get the next record (Step 130) and continues.

Referring back to Step 136, if the represented feature meets the defined initial conditions, the process 100 proceeds to evaluate additional data. If necessary, additional data is obtained from the database 110 (Step 142). The additional data may include the data records that represent features located nearby the feature under initial evaluation. For example, the additional data may include the data records for nearby features, such as successor road segments that connect to the road segment under initial evaluation. According to another alternative, the additional data may include other data associated with the feature under initial evaluation. As an example, in order to find turns where the superelevation is in the wrong direction, the process 100 will first evaluate whether the road segment is curved (e.g., in Steps 134 and 136) and then, if it is, evaluate whether the superelevation data associated with the road segment indicates that the superelevation of the road in the curved section is in the wrong direction (e.g., in Steps 144 and 150).

The additional data is evaluated (Step 144) and if the additional data does not meet the conditions, the feature under evaluation does not have the hazardous condition. In this case, the process 100 proceeds to the step in which it is determined whether all the records in the database have been examined (Step 138) and if there are more records to examine, the process 100 proceeds to get the next record (Step 130).

Referring back to Step 150, if evaluation of the additional data indicates that the conditions are met, a hazardous condition is determined to be present. In this case, the process 100 adds precautionary action data 160 to the database 110 (Step 156). The precautionary action data 160 indicates the presence of a feature in the road network where a precautionary action may be taken. After the precautionary action data 160 is added to the database 110, the process 100 proceeds to the step in which it is determined whether all the road segment records in the database have been examined (Step 138) and if there are more segment records to examine, the process 100 proceeds to get the next segment record (Step 130).

The process 100 ends when it is determined whether all the road segment records have been examined (Step 138).

It is noted that the process 100, above, performs a data mining function. The existence of the hazardous condition is derived from data already collected and present in the database. The process evaluates each data item to determine if it exceeds a defined hazardous threshold value, or the process evaluates multiple data items in the original database to determine whether when combined, those data items constitute a hazardous condition. By evaluating these individual and multiple data items, a determination is made whether these data items describe the condition of interest, the hazardous condition. If these data items do describe the condition, a new data item, i.e., the precautionary action data, is added to the database.

Figure 2:
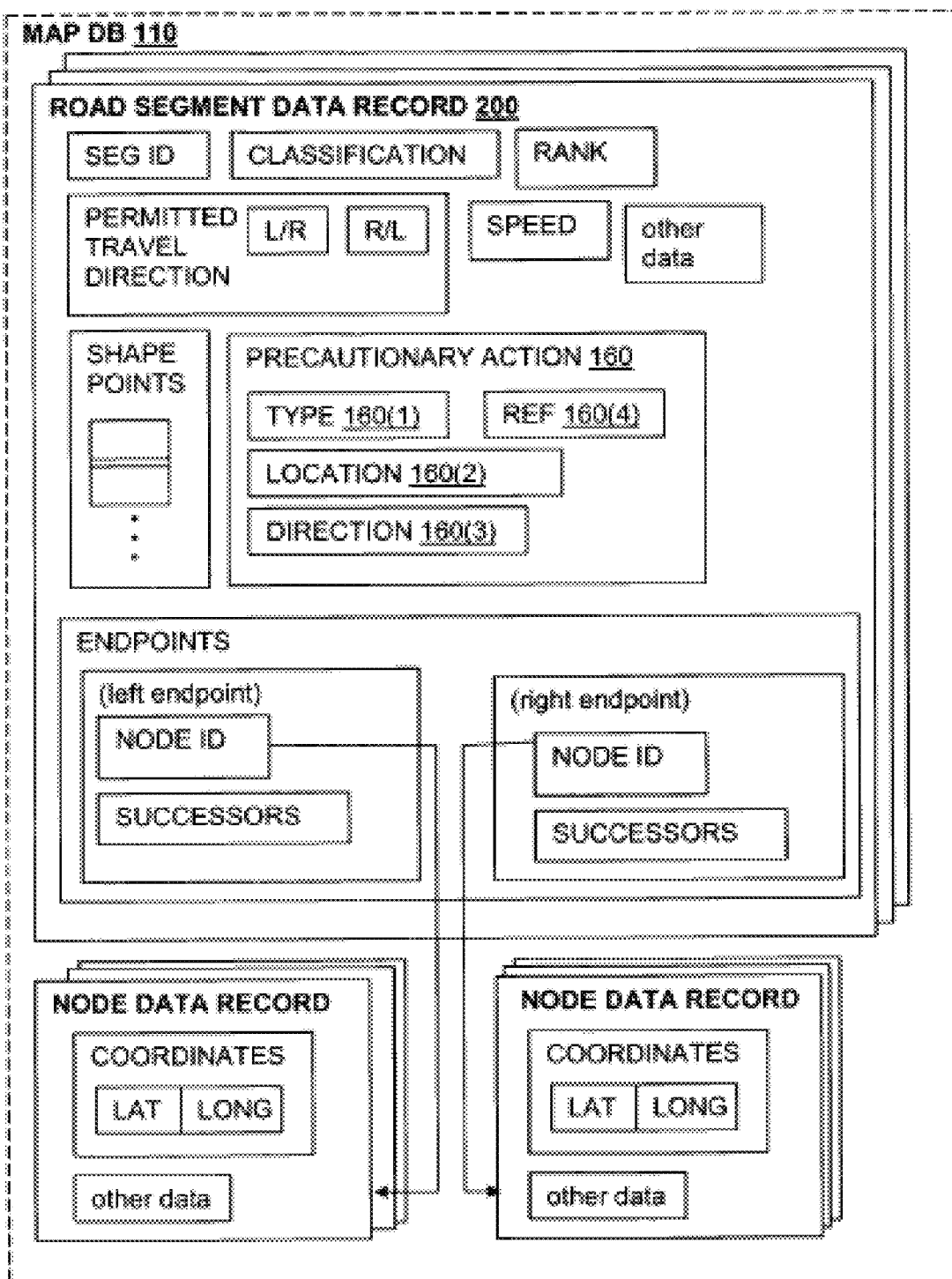
FIG. 2 is a diagram of a data record formed by the process of FIG. 1.

FIG. 2 is a diagram that shows a data record 200 in the database 110. The data record 200 represents a road segment located in a geographic region. As explained above, the geographic region may include an entire country or continent. Accordingly, the database 110 includes many data records like the one shown in FIG. 2.

The data record 200 shown in FIG. 2 is exemplary and shows only one way to represent a road segment. Databases may represent road segments in various different ways and may include different kinds of information. The present invention is not limited to any particular way of representing roads.

Referring to FIG. 2, various data are associated with the data record 200 that represents a road segment. These various data indicate features or attributes of the represented road segment. For example, associated with the data record is data that indicates the permitted direction(s) of travel. Also associated with the road segment record 200 are data that indicate a speed limit, a classification of the road segment (i.e., the type of road, such as controlled access, etc.), a rank (e.g., 1-4), the endpoints of the road segment, shape points (i.e., locations along the road segment between its endpoints). Also associated with the road segment records is data that indicate the successors at each endpoint. Successors are those road segments that connect to the represented road segment at each of its endpoints. The segment record 200 may identify these successors by reference to the data records that represent the successors.

In FIG. 2, the database 110 also includes precautionary action data 160. The precautionary action data 160 is the data added to the database 110 by the process 100 in FIG. 1. In FIG. 2, the precautionary action data 160 is shown as added to the road segment record 200. It should be understood that the process 100 adds precautionary action data 160 with respect to only certain records, i.e., records that represent those roads segments that meet the conditions identified by the process. Accordingly, the database 110 will contain data records that represent road segments that contain the precautionary action data 160 and other data records that represent road segments that do not contain the precautionary action data 160.

In the embodiment shown in FIG. 2, the precautionary action data 160 is associated with the road segment identified as having a potentially hazardous condition located thereon. In this embodiment, the precautionary action data 160 includes several components. One component 160(1) indicates a condition type. This condition type 160(1) indicates the type of condition about which a precautionary action is to be taken, which in this case is an intersection that is located at a bottom of a hill. This condition type 160(1) component is used when different conditions are identified in the database 110 about which precautionary action may be taken.

Another component of the precautionary action data 160 is the precautionary action location 160(2). The precautionary action location 160(2) indicates where along the represented road segment a precautionary action should be taken. The precautionary action location 160(2) data may include multiple entries. For example, the precautionary action location 160(2) may indicate where a warning may be provided to a vehicle driver to advise the driver about the upcoming potentially hazardous condition. The warning location 160(2) may indicate a distance (e.g., x meters) from the potentially hazardous condition. The location 160(2) is determined based on an analysis of factors, such as grade, curvature, speed limit, road classification, etc. These factors may be determined from other data contained in the database 110. According to one example, the location 160(2) may indicate that a warning should be provided at a location 400 meters along the road segment from the hazardous condition.

The precautionary action location 160(2) may also indicate where a vehicle control action should be taken, such as tightening the seatbelts, pre-loading or engaging the brakes, tightening sensitivities of lane departure warning systems or stability control systems, etc. This may be a different location from where the precautionary warning is provided and would be based on a different analysis of factors.

Another component of the precautionary action data 160 is direction data 160(3). The direction data 160(3) indicates the direction along the represented road segment where the precautionary action should be taken. Note that the database 110 may indicate a direction along a road segment as positive or negative based on the relative latitude and longitude of the road segment endpoints. Accordingly, the downhill direction may be indicated as positive or negative.

Another component of the precautionary action data 160 is a reference 160(4). In this case, the reference 160(4) indicates the actual location of the hazardous condition, e.g. the intersection at the bottom of the hill, the turn where the superelevation is in the wrong direction, etc. The reference 160(4) may refer to another data record that represents the actual location of the hazardous condition.

The precautionary action data 160 described in FIG. 2 is one way that this data may be included in a database that represents a geographic region. There are alternative ways to include the precautionary action data. For example, the precautionary action data may be included as separate data records in the database 110. If included as separate data records, the precautionary action data may be associated with the road segments to which they apply by pointers or other suitable data references. Alternatively, the precautionary action data may be associated with node data records. Various other ways exist and the present invention is not intended to be restricted to any specific implementation.

Figure 3:
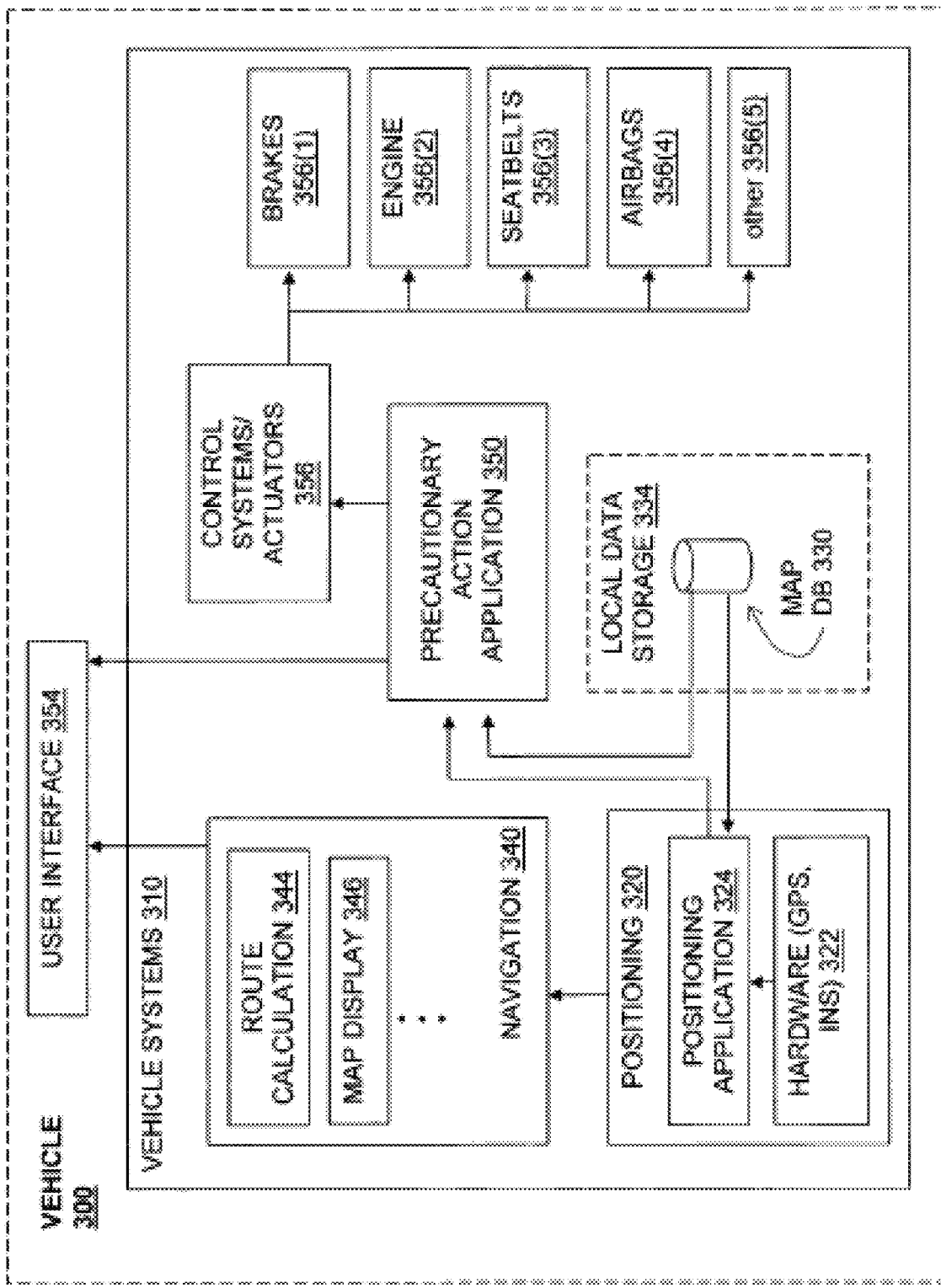
FIG. 3 is a diagram of a vehicle system that uses data produced by the process of FIG. 1.

FIG. 3 is a diagram depicting components of a vehicle 300. The vehicle 300 is operated on a road network, such as the road network represented by the database 110 in FIG. 2. The vehicle 300 may be an automobile, truck, bicycle, motorcycle, etc.

The vehicle 300 includes various systems 310. In this embodiment, the vehicle systems 310 include a positioning system 320. The positioning system 320 determines the position of the vehicle 300 on the road network. The positioning system 320 includes appropriate hardware and software to determine the position of the vehicle 300. For example, the positioning system may include hardware 322 that includes a GPS unit, an accelerometer, wheel speed sensors, etc. The positioning system 320 also includes a positioning application 324. The positioning application 324 is a software application that uses outputs from the positioning system hardware 322 and information from a map database 330. The positioning application 324 determines the position of the vehicle 300 with respect to the road network, including the location of the vehicle 300 along a road segment and a direction of travel of the vehicle along the road segment.

In one embodiment, the map database 330 is located in the vehicle. In an alternative embodiment, the map database 330 may be located remotely and accessed by the vehicle systems 310 using a wireless communication system. In yet another embodiment, part of the map database 330 may be located locally in the vehicle and part of the map database 330 may be located remotely.

The map database 330 is stored on a computer readable medium 334. The computer-readable medium may be implemented using any suitable technology. For example, the computer readable medium may be a DVD disk, a CD-ROM disk, a hard disk, flash memory, or any other medium, or a plurality of media.

The map database 330 includes data that represents the geographic region in which the vehicle 300 is being operated. The map database 330 may represent the same geographic region as the database 110 in FIG. 1, or alternatively, the map database 330 may represent only a portion of the region represented by the database 110.

The map database 330 used by the vehicle systems 310 may be in a different format from the database 110 in FIG. 1. The map database 330 is formed or derived from the database 110 by a compilation process that organizes and presents the data in a form and format that specifically facilitates its use for performing specific functions. For example, the map database 330 may be separated into different collections of data that are used for specific functions, such as vehicle positioning, route calculation, map display, route guidance, destination selection, and so on. The map database 330 may also be organized into groupings spatially. One kind of compiled database format is disclosed in U.S. Pat. No. 5,968,109, the entire disclosure of which is incorporated by reference herein. Various other compiled database formats exist, including proprietary formats, and the disclosed embodiment(s) are not limited to any particular format.

Included among the vehicle systems 310 in FIG. 3 is a navigation system 340. The navigation system 340 uses outputs from the positioning system 320 and data from the map database 330 to provide navigation-related features to a vehicle user, e.g., the vehicle operator or passenger. The navigation system 340 includes applications for route calculation 344, map display 346, as well as possibly other applications. The navigation system 340 provides the navigation-related features to the vehicle user via a user interface 354. (The navigation system 340 is optional and may be omitted.)

Also included among the vehicle systems 310 is a precautionary action application 350. The precautionary action application 350 uses outputs from the positioning system 320 and data from the map database 330 to take precautionary actions, such as provide warnings to the vehicle operator. The precautionary action application 350 provides the warning to the vehicle operator via the user interface 354.

FIG. 3 also shows that precautionary action application 350 provides an output to vehicle control systems and actuator 356. The vehicle control systems and actuator are operatively connected to various vehicle mechanical systems, such as the vehicle's brakes 356(1), engine 356(2), seatbelts (including tensioners) 356(3), airbags 356(4), stability control algorithms, as well as other system systems 356(5).

Figure 4:
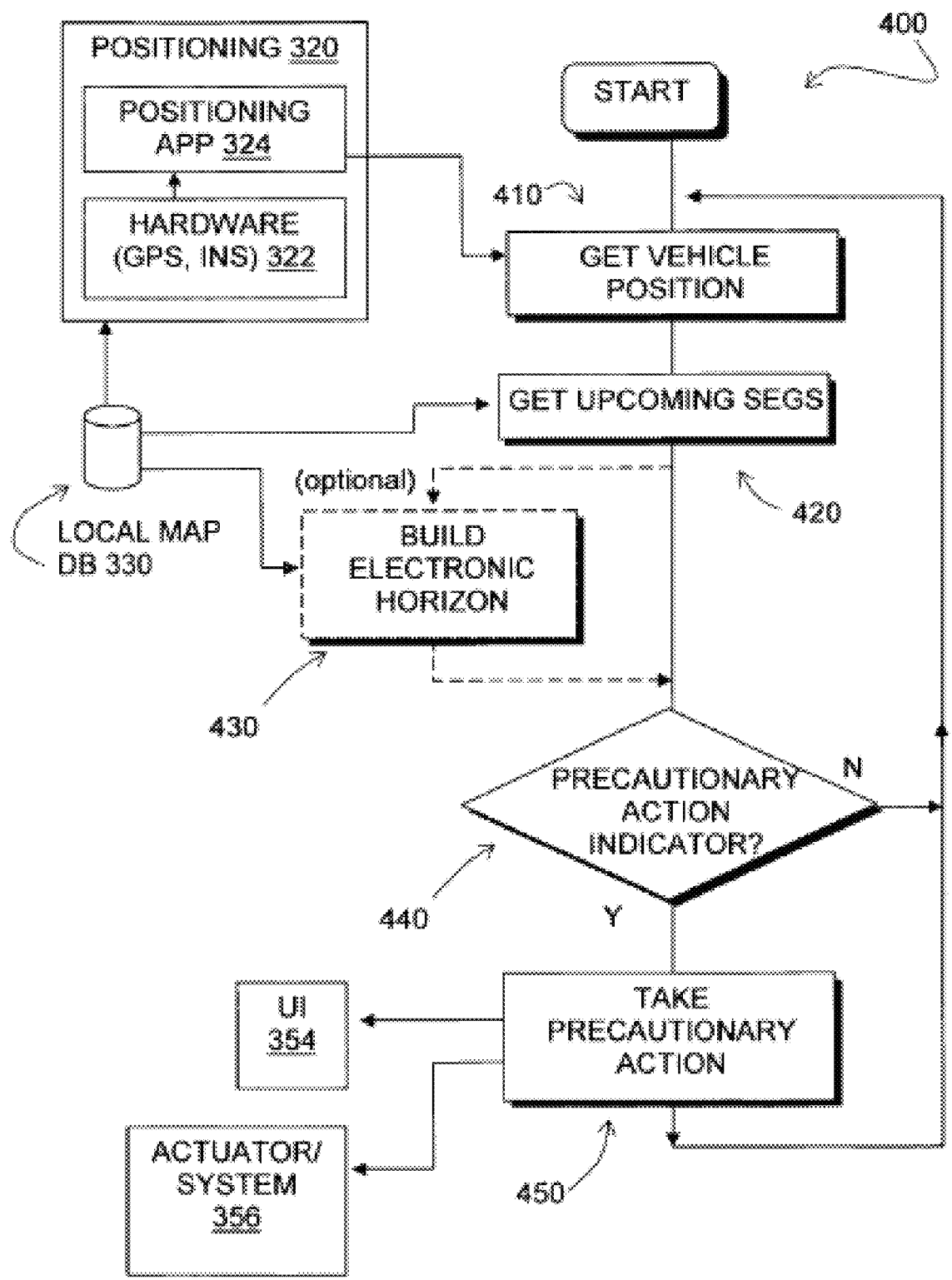
FIG. 4 is a flowchart of a process performed by the system of FIG. 3.

FIG. 4 is a flowchart 400 showing operation of the precautionary action application 350 (in FIG. 3). As the vehicle 300 (in FIG. 3) is being operated on a road, the precautionary action application 350 obtains the current vehicle position from the positioning system 320 (Step 410). (During vehicle operation, the positioning system 320 using data from the map database 330 to continuously determine the current geographic position of the vehicle 300.) The positioning system 320 provides the precautionary action application 350 with data that indicates the current vehicle position with respect to the road network as represented by the map database 330. Specifically, the location of the vehicle along a road segment and the direction of travel of the vehicle along the road segment are determined and provided to the precautionary action application 350.

Next, the process 400 obtains data from the map database 300 that represents the geographic features (i.e., roads, intersections, etc.) at the current location of the vehicle and in the direction in which the vehicle is heading (Step 420). In one embodiment, an electronic horizon is used (Step 430). Building an electronic horizon and using it to provide warnings are disclosed in U.S. Pat. Nos. 6,405,128 and 6,735,515 and U.S. patent application Ser. No. 11/400,151, the entire disclosures of which are incorporated by reference herein. Using an electronic horizon and/or the inventions disclosed in these patents and pending patent application is optional and the disclosed process 400 is not limited to using the electronic horizon technology.

After obtaining data from the map database 300 that represents the geographic features at the current location of the vehicle and in the direction in which the vehicle is heading, the process 400 includes the step of examining the data to determine whether any precautionary action data (160 in FIG. 2) is associated with the represented geographic features around the vehicle's current location (Step 440). If there is no precautionary action data associated with the represented geographic features, the process 400 loops back to get a new current vehicle position (Step 410). On the other hand, if there is precautionary action data associated with the represented geographic features, the process 400 takes a precautionary action (Step 450). The precautionary action may be a warning provided to the vehicle operator when the vehicle is at the location (i.e., 160(2) in FIG. 2) indicated by the precautionary action data. The warning may be provided via the user interface 354. The warning may be an audible warning message or a visual warning.

The precautionary action is not limited to warnings, but may also include other actions. For example, vehicle systems 356, such as the brakes, engine or transmission, can be readied for a quick deceleration or stop. In addition, the seatbelts may be tightened or the airbags set to deploy. As explained above, to facilitate these kinds of actions, additional information may be added to the warning data 160 (in FIG. 2) to indicate the type of action as well as the location where the action should be taken.

Referring still to FIG. 4, after taking the precautionary action, the process 400 loops back to get a new current vehicle position (Step 410).

Alternatives

In the above embodiments, it was described how a process for evaluating a database that represents a road network can evaluate each data record that represents a road segment in turn to identify potentially hazardous conditions. The process is not limited to evaluating data records that represent road segments, but may be applied to II data that represent any kind of feature, including nodes (intersections), boundaries, cartographic features, pedestrian walkways, bike paths, points-of-interest, and so on.

The process (100 in FIG. 1) was described as a way to automatically examine records in a database that represent roads to identify locations or conditions along the road network where a precautionary action might be taken. According to the process, data is then added to indicate the location where the precautionary action should be taken. Instead of automatically adding the precautionary action data to the database, the locations where such conditions are identified could be marked on a temporary basis. Then, a geographic analyst (or other human operator) could review some or all such temporarily marked locations and validate the condition. The analyst may conduct this review by physically traveling to the locations or by reviewing satellite or aerial photographs of the locations, or video taken while driving by the locations (previously or subsequently acquired either by the analyst or others including members of the public). Based on the review, the analyst then determines whether precautionary action data should be added to the database.

It was mentioned above, that statistical information exists about the locations where accidents occur. According to another alternative, the statistical information can be used in combination with the process described in FIG. 1 to provide more reliable information about accidents. For example, although information exists about locations of statistically high numbers of accidents, this information may not necessarily indicate why accidents occur or how to avoid them. Using the process of FIG. 1, review of the physical conditions of the road segment or combinations of attributes about that segment may indicate the likely cause for those statistically significant co-located accidents. The combination of identifying a hazardous physical condition located near a statistically significant number of actual accidents may be used as further validation of that location as a hazardous one.

According to another alternative, statistical accident data may be incorrectly located to sufficient degree that those accidents do not cluster enough to pass the threshold to declare a multiple accident location. However, with the process described in FIG. 1, once a potentially hazardous location is identified in the database, the distance threshold for statistical accident locations can be increased about that hazardous location to investigate whether there may be a significant number of accidents in that location in spite of their recorded positions to be in error.

The process (400 in FIG. 4) was described as a way to use the precautionary action data that had been stored in the map database to take an appropriate action in a vehicle when the vehicle is at or is approaching a location identified as having a potentially hazardous condition. This process uses a positioning system and map database in the vehicle to determine when the vehicle is at or is approaching such a location. The process may also take into account dynamic information. Dynamic information may include current traffic and weather conditions, ambient light conditions, road conditions (e.g., ice), and so on. The vehicle may include systems to obtain such information. For example, the vehicle may have a traffic data receiver that obtains real-time traffic information, e.g., RDS-TMC messages. The process 400 may use the dynamic information in combination with the precautionary action data. For example, the process may modify the location at which a warning is provided. As an example, if weather conditions indicate that it is raining, the location at which a warning is provided to the vehicle driver about an upcoming hazardous condition may be modified, i.e., adjusted to a point farther in advance of the location of the hazardous condition, in order to give the vehicle operator additional time or distance. The process may even take certain actions only under certain conditions. For example, a warning about an intersection located over a hill may be provided only during nighttime hours. During daylight, the condition may not warrant a warning.

According to another alternative, community input from citizens or organizations about road conditions may be gathered where, when sufficient comments occur about a particular location or segment of road, such as a locally known slippery road in wet weather conditions, then that location is defined to be a hazardous location and stored in the database as such.

In another alternative, a third party may request a map developer or an entity that has an editable version of a database that contains data that represents a road network in a geographic region to perform a data mining operation for a particular kind of condition. The third party may be an automobile manufacturer, for example. According to this alternative, a process for evaluating a database representing a road network for potentially hazardous conditions, such as the process described in connection with FIG. 1, is performed at the request of or under contract with the third party. Such an arrangement may arise when the third party wants to implement an Advanced Driver Assistance feature that complements a hardware-based system with a data-based system. For example, an automobile manufacturer may want to provide a curve warning system that uses a vehicle-mounted camera to detect upcoming curves visually in combination with a database in which are stored precautionary action data about curves that have decreasing curvature values, blind intersections, and less than sufficient superelevation. In this alternative, the third party identifies to the map developer the kind of condition to search for. The map developer, in turn, performs the data mining operation, as described in connection with FIG. 1, and delivers a database with the added precautionary data to the third party.

Is It is intended that the foregoing detailed description be regarded as illustrative rather than limiting and that it is understood that the following claims including all equivalents are intended to define the scope of the invention.

I claim:

1. A vehicle comprising:
   one or more vehicle mechanical systems;
   a positioning system that determines a current location of the vehicle along a road of a road network;
   a database that contains data representing the geographic region in which the vehicle is being operated, wherein the data includes data that represents roads of the road network and precautionary action data associated with a plurality of locations of the road network, wherein each of the plurality of locations comprises a location at which it has been determined, prior to approach of the location by the vehicle, based on the data in the database, that a combination of a first condition and a second condition are both satisfied at that location based on one or more attributes of one or more geographic features located at or around the location;
   a precautionary action application, responsive to the positioning system and the database, that determines whether, based on the current location of the vehicle, the vehicle is approaching a location associated with precautionary action data; and
   a vehicle control system coupled with the one or more vehicle mechanical systems and responsive to the precautionary action application to actuate at least a subset of the one or more vehicle mechanical systems to take a precautionary action when the precautionary action application determines that the vehicle is approaching a location associated with precautionary action data.

2. The vehicle of claim 1 wherein the first condition comprises a first feature existing at the location or an attribute thereof exceeding a threshold and the second condition comprises a second feature existing at the location or an attribute thereof exceeding a threshold.

3. The vehicle of claim 2 wherein each of the plurality of locations is one where a hazardous condition exists which may impair operation of the vehicle, the hazardous condition being characterized by the first and second conditions.

4. The vehicle of claim 1 wherein the one or more vehicle mechanical systems comprise brakes, engine, seatbelts, airbags, or stability control.

5. The vehicle of claim 1 wherein the positioning system is further operative determine a direction of travel of the vehicle and wherein the precautionary action data further includes data that indicates a direction along a road segment at which a precautionary action is to be taken, wherein the precautionary action application is further operative to determine whether the vehicle is approaching the location along a road of the road network associated with precautionary action data in the direction along the road segment at which the precautionary action is to be taken, the vehicle control system being further responsive thereto.

6. The vehicle of claim 1 wherein the precautionary action data further includes data that indicates a location along a road segment at which the precautionary action is to be taken by the vehicle preceding the location along the road of the road network associated with the precautionary action data, wherein the precautionary action application is further operative to determine whether the vehicle is at the location at which the precautionary action is to be taken, the vehicle control system being further responsive thereto.

7. The vehicle of claim 1 wherein the combination of the first and second conditions comprise one of a: a turn with a decreasing radius of curvature, a turn where the superelevation (bank angle) is insufficient or in the wrong direction, a downhill segment that has an intersection at the bottom of the hill, a downhill segment that has a stop sign or stoplight at the bottom of the hill, a sharp curve on a downhill slope, a curve that has a stop sign or stoplight somewhere along the curve, a blind intersection either because it is in a turn or over a hill, an unusually narrow lane or road, a lane merge, a road entrance with no stop sign or stoplight that has no merge lane, and a curve with a lower speed recommendation than the preceding straight segment speed limit.

8. The vehicle of claim 1 further comprising one or more sensors operative to sense conditions ahead of the vehicle, wherein the combination of the satisfaction of the first and second conditions is not capable of being sensed by the sensors.

9. The vehicle of claim 8 wherein the one or more sensors comprise camera or radar.

10. The vehicle of claim 9 wherein the precautionary action application determines whether the vehicle is approaching a location associated with precautionary action data before any of the one or more sensors can sense the combination of the satisfaction of the first and second conditions.

11. The vehicle of claim 1 wherein the precautionary action application determines whether the vehicle is approaching a location along a road of the road network associated with precautionary action data when the vehicle is operating in inclement weather.

12. The vehicle of claim 1 wherein the precautionary action includes maneuvering the vehicle, tightening seatbelts, pre-loading or engaging brakes, tightening sensitivities of lane departure warning systems or stability control systems, or readying the brakes, engine or transmission for quick deceleration or stop.

13. The vehicle of claim 1 wherein the precautionary action application is further operative to factor in dynamic information when determining whether the vehicle is approaching a location along a road of the road network associated with precautionary action data.

14. The vehicle of claim 13 wherein the dynamic information includes current traffic conditions, current weather conditions, current ambient light conditions, current road conditions, or combinations thereof.

15. The vehicle of claim 13 wherein the precautionary action application is further operative to alter a location at which a precautionary action is to be taken based on the dynamic information.

16. The vehicle of claim 1 wherein the database further includes precautionary action data in association with one or more locations for which sufficient comments occurring about the particular location have been received via community input from citizens or organizations.

17. A method of operating a vehicle, the method comprising:
    determining, using a positioning system, a current location of the vehicle along a road of a road network;
    accessing a database that contains data representing the geographic region in which the vehicle is being operated, wherein the data includes data that represents roads of the road network and precautionary action data associated with a plurality of locations along the road network, wherein each of the plurality of locations comprises a location at which it has been determined, prior to approach of the location by the vehicle, based on the data in the database, that a combination of a first condition and a second condition are both satisfied at that location based on one or more attributes of one or more geographic features located at or around the location;
    determining, by a precautionary action application, responsive to the determination of the current position of the vehicle and the access to the database, whether, based on the current location of the vehicle, the vehicle is approaching a location associated with precautionary action data; and
    actuating, by a vehicle control system coupled with one or more vehicle mechanical systems and responsive to the precautionary action application, at least a subset of the one or more vehicle mechanical systems to take a precautionary action when the precautionary action application determines that the vehicle is approaching a location associated with precautionary action data.

18. The method of claim 17 wherein the first condition comprises a first feature existing at the location or an attribute thereof exceeding a threshold and the second condition comprises a second feature existing at the location or an attribute thereof exceeding a threshold.

19. The method of claim 17 wherein each of the plurality of locations is one where a hazardous condition exists which may impair operation of the vehicle, the hazardous condition being characterized by the first and second conditions.

20. The method of claim 17 wherein the one or more vehicle mechanical systems comprise brakes, engine, seatbelts, airbags, or stability control.

21. The method of claim 17 wherein the determining of the current location further comprises determining a direction of travel of the vehicle and wherein the precautionary action data further includes data that indicates a direction along a road segment at which a precautionary action is to be taken, wherein the determining of whether the vehicle is approaching the location along a road of the road network associated with precautionary action data further comprises determining whether the vehicle is approaching in the direction along the road segment at which the precautionary action is to be taken, the actuating being further responsive thereto.

22. The method of claim 17 wherein the precautionary action data further includes data that indicates a location along a road segment at which the precautionary action is to be taken by the vehicle preceding the location along the road of the road network associated with the precautionary action data, wherein the determining whether the vehicle is approaching a location along a road of the road network associated with precautionary action data further comprises determining whether the vehicle is at the location at which the precautionary action is to be taken, the actuating being further responsive thereto.

23. The method of claim 17 wherein the combination of the first and second conditions comprise one of a: a turn with a decreasing radius of curvature, a turn where the superelevation (bank angle) is insufficient or in the wrong direction, a downhill segment that has an intersection at the bottom of the hill, a downhill segment that has a stop sign or stoplight at the bottom of the hill, a sharp curve on a downhill slope, a curve that has a stop sign or stoplight somewhere along the curve, a blind intersection either because it is in a turn or over a hill, an unusually narrow lane or road, a lane merge, a road entrance with no stop sign or stoplight that has no merge lane, and a curve with a lower speed recommendation than the preceding straight segment speed limit.

24. The method of claim 17 further comprising one or more sensors operative to sense conditions ahead of the vehicle, wherein the combination of the satisfaction of the first and second conditions is not capable of being sensed by the sensors.

25. The method of claim 24 wherein the one or more sensors comprise camera or radar.

26. The method of claim 24 wherein the determining whether the vehicle is approaching a location associated with precautionary action data further comprises determining whether the vehicle is approaching a location along a road of the road network associated with precautionary action data before any of the one or more sensors can sense the combination of the satisfaction of the first and second conditions.

27. The method of claim 17 wherein the determining whether the vehicle is approaching a location along a road of the road network associated with precautionary action data further comprises determining whether the vehicle is approaching a location along a road of the road network associated with precautionary action data when the vehicle is operating in inclement weather.

28. The method of claim 17 wherein the actuating includes maneuvering the vehicle, tightening seatbelts, pre-loading or engaging brakes, tightening sensitivities of lane departure warning systems or stability control systems, or readying the brakes, engine or transmission for quick deceleration or stop.

29. The method of claim 17 wherein the determining whether the vehicle is approaching a location along a road of the road network associated with precautionary action data further comprises determining further comprises factoring in dynamic information when determining whether the vehicle is approaching a location along a road of the road network associated with precautionary action data.

30. The method of claim 29 wherein the dynamic information includes current traffic conditions, current weather conditions, current ambient light conditions, current road conditions, or combinations thereof.

31. The method of claim 29 further comprising altering a location at which a precautionary action is to be taken based on the dynamic information.

32. The method of claim 17 wherein the database further includes precautionary action data in association with one or more locations for which sufficient comments occurring about the particular location have been received via community input from citizens or organizations.

33. A method of operating a vehicle, the method comprising:
- determining, using a positioning system, a current location of the vehicle along a road;
- accessing a database that contains data representing the geographic region in which the vehicle is being operated, wherein the data includes data that represents roads of the road network and precautionary action data associated with a plurality of locations along the roads, wherein each of the plurality of locations comprises a location at which it has been determined, prior to approach of the location by the vehicle, based on the data in the database, that a combination of a first condition and a second condition are satisfied together at that same location along the road based on one or more attributes of one or more geographic features at or around the location;
- determining, by a precautionary action application before an operator or sensors of the vehicle can sense the combined satisfaction of the first and second conditions, responsive to the determination of the current position of the vehicle and the access to the database, whether, based on the current location of the vehicle, the vehicle is approaching a location associated with precautionary action data; and
- actuating, by a vehicle control system coupled with one or more vehicle mechanical systems and responsive to the precautionary action application, at least a subset of the one or more vehicle mechanical systems to take a precautionary action when the precautionary action application determines that the vehicle is approaching a location associated with precautionary action data.

* * * * *